Dec. 19, 1933. E. G. BAILEY ET AL Re. 19,033

RETAINING MEANS FOR FURNACE WALL BLOCKS

Original Filed Oct. 20, 1927

INVENTORS
Erwin G. Bailey
Keith M. Hardgrove
BY
Gifford & Scull
ATTORNEYS

Reissued Dec. 19, 1933 Re. 19,033

UNITED STATES PATENT OFFICE 19,033

RETAINING MEANS FOR FURNACE WALL BLOCKS

Ervin G. Bailey, Easton, Pa., and Ralph M. Hardgrove, Westfield, N. J., assignors to Fuller Lehigh Company, Fullerton, Pa., a corporation of Delaware Original application October 20, 1927, Serial No. 227,456, which was divided and application November 17, 1928. Serial No. 320,038. Patent No. 1,747,614, dated February 18, 1930. Application for reissue February 18, 1932. Serial No. 593,933

9 Claims. (Cl. 122—6)

This invention relates to a furnace wall and blocks with means for keeping the furnace wall blocks or tile in firm contact with water wall tubes located in the furnace wall, so as to maintain a good contact for the best heat conduction between the tile and tubes, and yet provide an attachment in such a manner that broken or injured blocks or tile can be removed and replaced by new ones. This is a division of our application Ser. No. 227,456, filed October 20, 1927.

Figure 1:
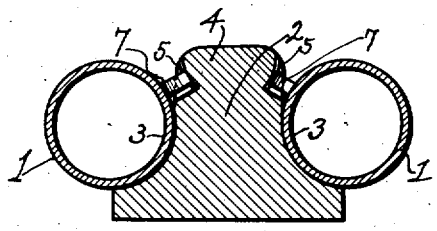
Figure 2:
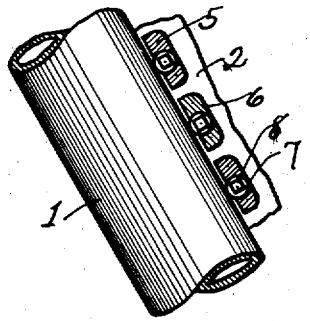

The invention will be understood from the description in connection with the accompanying drawing in which Fig. 1 is a section through two of the furnace wall tubes and one of the tile and Fig. 2 is a side view of Fig. 1.

In the drawing reference character 1 indicates water tubes of the furnace wall to which the water wall blocks or tile 2 are applied. Each block or tile 2 is somewhat T-shaped in cross section and is provided with rounded portions or curved surfaces 3 to fit against the tubes and with an extension 4 that projects beyond the center lines of the tubes. The sides of the projecting portions 4 are provided with recesses 5, so shaped that wedge-shaped spaces are provided between the bottoms of the recesses and the surfaces of the tubes, as more clearly indicated at 6 in Fig. 2.

Keying members are employed to fit in the wedge-shaped spaces or recesses 5 contacting with the surfaces of the tubes and holding the block or tile 2 in good contact with adjacent tubes 3. These keying members are substantially cylindrical, and are illustrated in the drawing as rollers 7 but are obviously not limited to the particular construction here presented by way of illustration.

Rollers 7 with square-shaped holes 8 for the insertion of a wrench with a square end are placed in the recesses 5 and by turning the same they are moved into the narrower portions of the spaces, thereby causing the tile 2 to be firmly pressed into contact with the tubes 1. When a roller is rotated it has a movement of translation relative to a tube and the associated tile. Unequal resistances on opposite sides of the rollers will cause this result. As shown there is substantially a point contact between a roller and the tube on one side of the former, while a line contact between the tile and a roller on the opposite side creates the greater resistance.

The rollers 7 can be withdrawn entirely by first turning them to move to the larger portions of the wedge-shaped spaces and then taking them out, whereupon the tile 2 can be easily withdrawn.

Changes and modifications can be made without departing from the spirit or scope of the invention. It is to be understood that where the word "tile" is used in the specification and claims it is meant to include blocks as well, that may be made entirely of metal, or composite blocks made of metal and refractory material.

We claim:

1. In a furnace wall, water tubes, tile having a portion between said tubes extending beyond the center line thereof, recesses in the sides of said extending portion, and rollers between said recesses and tubes for keeping said tile in place.

2. In a furnace wall, water tubes, tile having a portion between said tubes extending beyond the center line thereof, recesses in the sides of said extending portion, having the bottoms thereof at an angle to the surfaces of the tubes, and rollers between said recesses and tubes for keeping said tile in place.

3. In a furnace wall, water tubes, tile having a portion between said tubes extending beyond the center line thereof, recesses in the sides of said extending portion, so shaped as to provide wedge shaped spaces between the bottoms of the recesses and the surfaces of the tubes, and rollers between said recesses and tubes for keeping said tile in place.

4. In a furnace wall, water tubes, tile having a portion between said tubes extending beyond the center line thereof, recesses in the sides of said extending portion, and rollers between said recesses and tubes for keeping said tile in place, said rollers being provided with non-circular holes in the ends thereof.

5. In a furnace wall, water tubes, tile having a portion between said tubes extending beyond the center line thereof, recesses in the sides of said extending portion, and rollers between said recesses and tubes for keeping said tile in place, the axes of said rollers being at an angle to the axes of the tubes.

6. In a furnace wall, water tubes, tile having curved portions contacting with said tubes and a portion between said tubes extending beyond the center line thereof, recesses in the sides of said extending portion, and rollers between said recesses and tubes for keeping said tile in place.

7. In a furnace, a row of spaced fluid conducting tubes, wall blocks having extensions located between adjacent tubes, and clamping members rotatably interposed relative to inclined surfaces of the extensions and the tubes, the rotation of said members causing them to have movement of translation relative to the blocks to tighten them against the tubes.

8. In a furnace, a row of spaced fluid conducting tubes, wall blocks having extensions located between adjacent tubes, and rotatable clamping members abutting inclined surfaces of the extensions and the tubes, the rotation of said members causing them to have movement of translation relative to the blocks to tighten them against the tubes.

9. In a furnace, a row of spaced fluid conducting tubes, wall blocks having extensions located between adjacent tubes, and cylindrical clamping members rotatably interposed relative to inclined surfaces the extensions and the tubes, and abutting against those surfaces and the tubes, the rotation of said members causing them to have movement of translation relative to the blocks to tighten them against the tubes.

ERVIN G. BAILEY.
RALPH M. HARDGROVE.